United States Patent [19]

Gowetski et al.

[11] 4,088,525

[45] May 9, 1978

[54] METHOD OF MAKING FIBER GLASS PARTS WITH STUD SUPPORTS

[75] Inventors: Michael Gowetski, Muncie; Robert W. Smith, Marion, both of Ind.

[73] Assignee: The General Tire & Rubber Company, Akron, Ohio

[21] Appl. No.: 713,757

[22] Filed: Aug. 12, 1976

[51] Int. Cl.² .......................... B29D 3/02; B29C 5/00
[52] U.S. Cl. .................................... 156/173; 156/245; 264/137; 264/250; 264/257; 264/271; 264/275; 264/279
[58] Field of Search ............... 264/137, 257, 258, 263, 264/299, 250, 271, 279, 339, 259, 275, 331, 250; 156/173, 175, 169, 245

[56] References Cited

U.S. PATENT DOCUMENTS

| | | | |
|---|---|---|---|
| 1,266,936 | 5/1918 | Harris | 264/271 |
| 1,640,543 | 8/1927 | Gudge | 264/258 |
| 1,998,964 | 4/1935 | Mansur | 264/271 |
| 2,710,026 | 6/1955 | Stewart et al. | 264/137 |
| 3,044,922 | 7/1962 | Kappel | 264/258 |
| 3,594,247 | 7/1971 | Pennington et al. | 156/175 |

*Primary Examiner*—Willard E. Hoag

[57] ABSTRACT

In the manufacture of a glass fiber reinforced plastic part a chopped glass fiber reinforced, thermosetting resin is placed in a mold cavity. A continuous filament glass fiber cylinder impregnated with the same resin used in the above formulation without chopped glass fiber is placed in the stud support areas of the mold. The mold is then closed and the resin subjected to heat and pressure to cause it to completely fill the mold cavity and cure. The cured part has continuous filament glass fiber reinforcements in the stud support areas.

1 Claim, 6 Drawing Figures

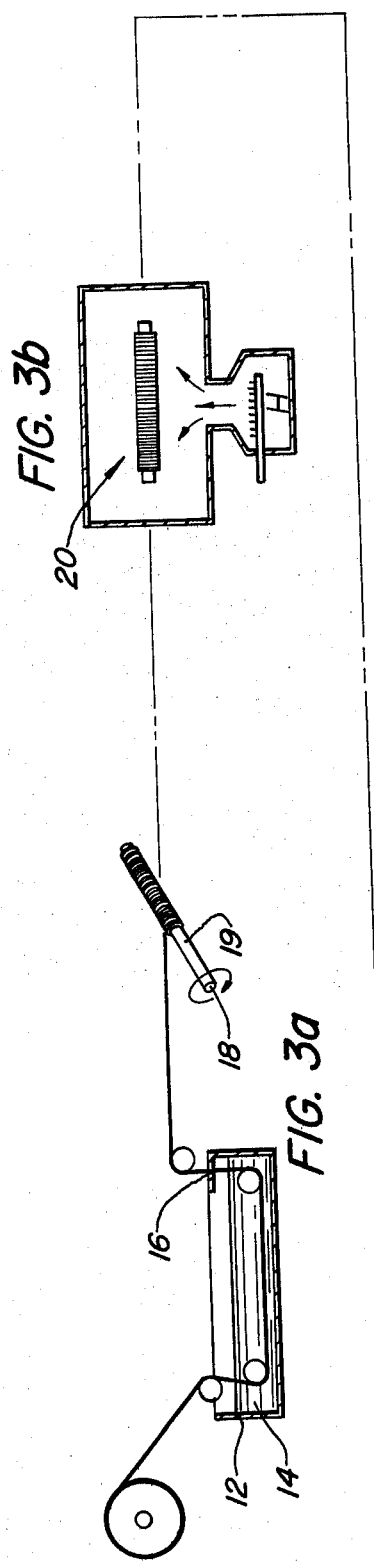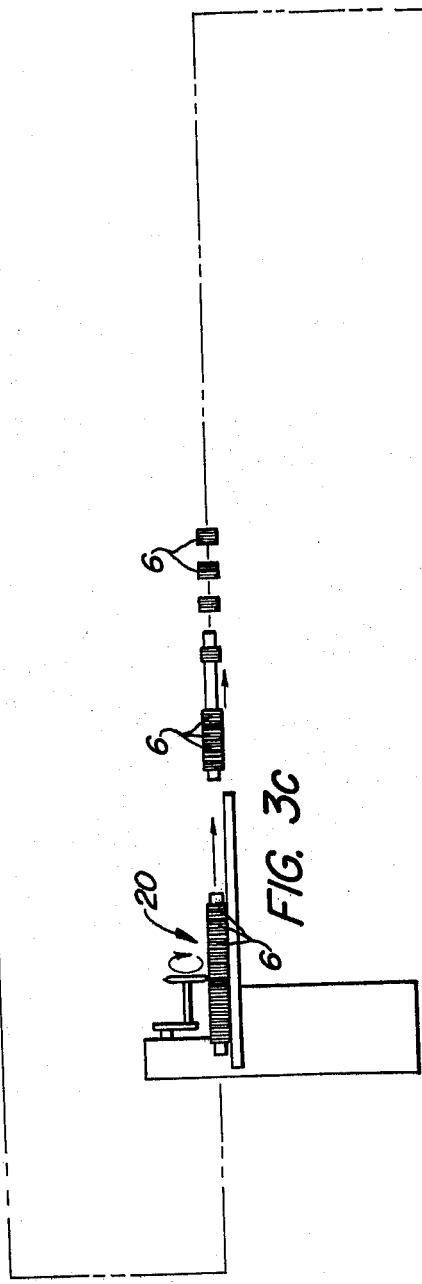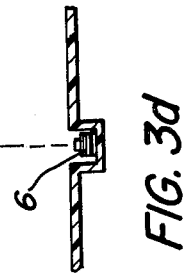

METHOD OF MAKING FIBER GLASS PARTS WITH STUD SUPPORTS

BACKGROUND OF THE INVENTION

This invention relates to molded chopped glass fiber reinforced plastic parts having glass fiber cylindrical continuous filament reinforcement in the stud support areas, and a method of making same.

DESCRIPTION OF THE PRIOR ART

Molded chopped glass fiber reinforced plastic parts are usually made by placing a chopped glass fiber containing, thermoplastic, thermosetting resin (sheet molding compound or SMC) in a mold cavity and then with heat and pressure causing the resin to fill the cavity and cure. When such parts had stud supports it was often difficult to insert the studs in the stud support openings without breaking the stud support. It was also difficult to retain the studs in the openings. In addition, sometimes the openings would not completely fill. This has resulted in considerable difficulty in the manufacture of grill panel openings for automobiles.

Using the prior art procedure, difficulties were encountered with the stud supports in as high or higher than 50% of the grill panel openings produced in some runs. In addition, the automobile manufacturers had difficulties with the grill panel openings upon assembly of automobiles. The studs would come loose from the stud supports during travel of the automobile down the assembly line and seriously interferred with the normal mass productive system.

SUMMARY OF THE INVENTION

It has been discovered that by inserting continuous filament glass fiber cylinders impregnated with the same thermosetting resin used in making the part, into the stud support areas of the mold prior to molding of the plastic part that the problem of stud support failure was eliminated. Other methods of attempting to solve the problem such as inserting thermosetting resin having higher than normal loading of chopped glass fibers and the insertion of thermosetting resin impregnated chopped fiberglass matting into the stud support openings failed to solve the problem.

BRIEF DESCRIPTION OF THE DRAWINGS

FIGS. 3a, b, c and d are schematic drawings of a method for making resin impregnated glass fiber cylinders and inserting them into a mold.

DESCRIPTION OF THE PREFERRED EMBODIMENTS

Figure 1:
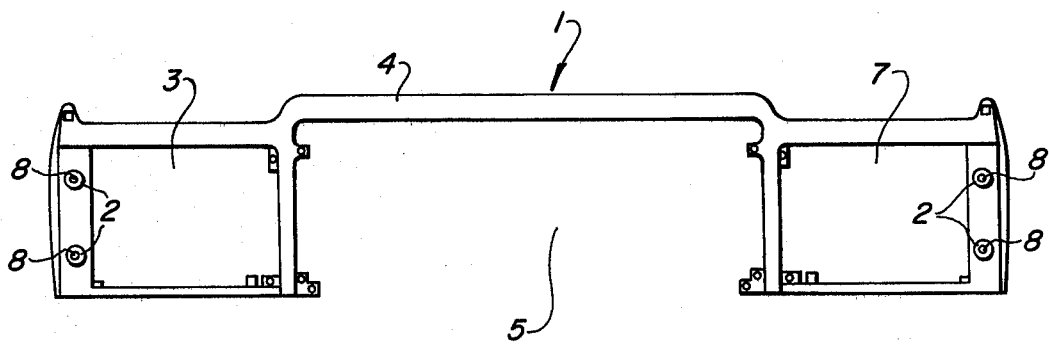
FIG. 1 is a rear view of a grill opening panel having a number of circular stud supports.
Figure 2:
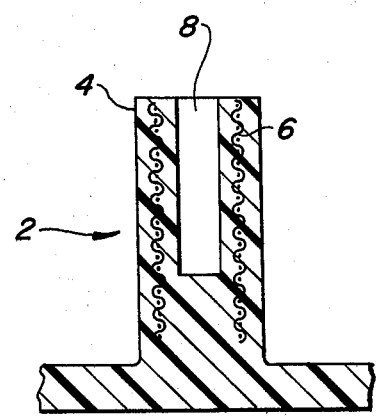
FIG. 2 is a cross-sectional view of one of the stud supports showing embedded fiberglass.

Turning now more particularly to FIG. II a cross-sectional view of stud support 2 is shown. The stud support is composed of a chopped glass fiber filled resin 4. Embedded in this resin is a continuous filament glass fiber cylinder 6. The stud support opening is shown at 8. The body of the grill panel opening 1 is also composed of glass fiber filled resin. Stud supports on the grill panel opening are shown at 2 and the panel openings at 3, 5 and 7. The glass fiber part having reinforced stud supports is made by the following procedure.

Thermosetting resin impregnated continuous filament glass fiber cylinders are positioned in the openings of the mold which form the stud supports (FIG. 3d). The cylinders were manufactured by passing glass strands 10 through a container 12 of the resin 14 used to make the SMC (with holes 16 just large enough for the glass) and then winding it on a rod 9.4 millimeters in diameter and 610 millimeters long wrapped with polyethylene 19 (see FIG. 3a and 3c). The rod 18 was then heated for 1 hour at about 85° C (FIG. 3b). The cylinder reached the 'B' state of maturation.

The long cylinder was then cut to 25 millimeter length cylinders and removed from the rod.

The cylinders have a length of 25 millimeters, an outer diameter of 12 millimeters and an inner diameter of 9.4 millimeters. Chopped glass fiber filled thermoplastic thermosetting resin (SMC) is placed in appropriate areas of the mold cavity in a sufficient amount to fill the cavity when the mold is closed. The mold is closed and heated and the pressure causes the chopped glass fiber filled resin to fill the mold cavity including the spaces around the resin impregnated woven glass fiber cylinders. The resin is cured in the mold cavity to form the desired part having reinforced stud supports and then removed. The results were that there were no cracks on any of the stud supports. Ten parts were checked to torque and they all passed the 8.46 Newton meter torque test. The test involved inserting self-threading studs into the supports and torquing them to 8.46 Newton meters.

Equivalent results were obtained using a woven glass fiber cylinder impregnated with the same resin used in the manufacture of the SMC. By the same resin is meant all of the ingredients which go into the SMC except the chopped glass fiber.

By continuous filament glass fiber is meant that the filaments are of sufficient lengths and positioned such a way as to completely encircle the opening in the stud support. In other words, each filament has a length greater than the circumference of the cylinder, and encircles the cylinder at least once.

The preferred (SMC) is a mixture of an unsaturated polyester dissolved in styrene. The resin contains a peroxide, lubricant, glass fiber, curing agent and filler. The fiberglass constitutes 15 to 60% of the mix by weight preferably 22 to 35%. The glass fiber is 12 to 50 millimeters long and has a very small diameter. The polyester plus styrene usually constitutes about 15% by weight of the mix. The lubricant, e.g., zinc sterate and the peroxide are present in small amounts. A small amount of a thickener such as magnesium oxide is also present. Impract modifiers such as butadiene-styrene block copolymers are optional ingredients. Details of the materials used in making sheet molding compounds form no part of the present invention and are disclosed in SPI Handbook of Technical and Engineering of Reinforced Plastics/Composites by J. Gilbert Mohr, et al., Second Edition, Copyright 1973 Van Nostrandt. In particular see pages 175 through 242.

These sheet molding compounds are well-known in the art and will not be described in detail here. Preferably the same sheet molding resin without the chopped glass fibers is used to impregnate the continuous filament glass fiber cylinder as is used to reinforce the stud openings.

While the preferred embodiment has been directed to a grill panel opening, the stud support of the present invention is equally applicable to any glass fiber part containing stud supports.

We claim:

1. A method of forming and curing in a mold cavity, a glass fiber reinforced plastic part having stud supports molded into the part which comprises:
   (a) forming a continuous filament glass fiber cylinder impregnated with a heat curable resin,
   (b) forming said glass fiber cylinder to fit between a pin and a wall which form a recess which subsequently forms the stud supports, and inserting the cylinder into the recess,
   (c) placing in the mold cavity additional flowable heat curable said resin containing chopped glass fiber; and
   (d) applying heat and pressure to cause the chopped glass fiber and resin to flow and fill the mold including space surrounding said cylinder, and
   (e) curing said resin.

* * * * *